(12) United States Patent
Schaumann

(10) Patent No.: US 7,785,029 B2
(45) Date of Patent: Aug. 31, 2010

(54) BALL JOINT

(75) Inventor: Lothar Schaumann, Ratingen (DE)

(73) Assignee: TRW Automotive GmbH (DE)

( * ) Notice: Subject to any disclaimer, the term of this patent is extended or adjusted under 35 U.S.C. 154(b) by 0 days.

(21) Appl. No.: 12/279,910

(22) PCT Filed: Feb. 14, 2007

(86) PCT No.: PCT/EP2007/001282

§ 371 (c)(1),
(2), (4) Date: Dec. 11, 2008

(87) PCT Pub. No.: WO2007/096081

PCT Pub. Date: Aug. 30, 2007

(65) Prior Publication Data

US 2009/0154989 A1 Jun. 18, 2009

(30) Foreign Application Priority Data

Feb. 22, 2006 (DE) ................. 10 2006 008 250

(51) Int. Cl.
F16C 11/00 (2006.01)

(52) U.S. Cl. .................. 403/132; 403/133; 403/135

(58) Field of Classification Search ......... 403/122–125, 403/133–135
See application file for complete search history.

(56) References Cited

U.S. PATENT DOCUMENTS

| 3,329,454 | A | * | 7/1967 | Melton et al. ................. 403/77 |
| 3,413,023 | A | | 11/1968 | Herbenar |
| 3,482,487 | A | * | 12/1969 | Leffers ......................... 92/176 |
| 3,560,035 | A | * | 2/1971 | Kindel .......................... 403/140 |
| 3,711,136 | A | * | 1/1973 | Schmidt ....................... 403/140 |
| 4,720,205 | A | | 1/1988 | Ito |
| 5,116,159 | A | * | 5/1992 | Kern et al. .................... 403/132 |
| 5,427,467 | A | * | 6/1995 | Sugiura ........................ 403/140 |
| 5,752,780 | A | * | 5/1998 | Dorr ............................. 403/135 |
| 5,799,968 | A | * | 9/1998 | Loeffler ................... 280/93.511 |
| 5,851,082 | A | | 12/1998 | Schmudde et al. |
| 6,109,816 | A | * | 8/2000 | Iwasaki ........................ 403/135 |
| 6,688,799 | B2 | * | 2/2004 | Broker et al. ................ 403/135 |
| 7,322,769 | B2 | * | 1/2008 | Heuser et al. ................ 403/142 |

FOREIGN PATENT DOCUMENTS

| DE | 1 575 662 | 2/1970 |
| DE | 39 20 243 C2 | 1/1991 |
| DE | 197 56 984 A1 | 12/1997 |
| EP | 0 231 479 A2 | 8/1987 |
| EP | 0 442 602 A1 | 8/1991 |
| EP | 0 638 735 A1 | 2/1995 |
| EP | 0 675 296 A1 | 10/1995 |
| EP | 0 784 755 B1 | 7/1997 |

* cited by examiner

Primary Examiner—Daniel P Stodola
Assistant Examiner—Nahid Amiri
(74) Attorney, Agent, or Firm—MacMillan, Sobanski & Todd, LLC

(57) ABSTRACT

A ball joint, particularly an axial joint, having a housing, a bearing shell which is arranged in the housing, and a ball pin with a ball head which is arranged in the bearing shell, is characterized in that the bearing shell is bent open elastically by the ball head so that the restoring force resulting from its deformation applies a prestress onto the ball head which attempts to press the latter out of the housing.

6 Claims, 2 Drawing Sheets

BALL JOINT

CROSS-REFERENCE TO RELATED APPLICATIONS

This application is a National Stage of International Application No. PCT/EP2007/001282 filed Feb. 14, 2007, the disclosures of which are incorporated herein by reference in entirety, and which claimed priority to German Patent Application No. 10 2006 008 250.8 filed Feb. 22, 2006, the disclosures of which are incorporated herein by reference in entirety.

BACKGROUND OF THE INVENTION

The invention relates to a ball joint, particularly an axial joint, having a housing, a bearing shell which is arranged in the housing, and a ball pin with a ball head which is arranged in the bearing shell.

Generally in ball joints and particularly in axial ball joints, the problem arises that with increasing wear of the bearing shell, a play of the ball head in the housing can occur. This play is basically undesirable.

An axial ball joint according to the prior art is shown in FIGS. 1 and 3. In FIG. 1, the axial ball joint is shown in an installed state before the housing is closed, and in FIG. 3 the ball joint is shown in the fully installed state. A housing 10 can be seen, in which a bearing shell 12 is arranged. A ball head 14 of a ball pin 16 is inserted into the bearing shell. In the fully installed state of FIG. 3, the marginal region 18 of the housing is flanged inwards, so that the ball head 14 is held securely in the housing 10.

In FIG. 2 the characteristic is shown of displacements of the ball head 14 in the case of stress in the direction of arrow F. It can be seen that the curve of force over displacement of the ball head rises sharply, because the ball head can only be displaced when the bearing shell is compressed. A high force is necessary for this.

In FIG. 4a the curve is shown which is produced in the case of a closed, fully installed ball joint under stress in axial direction. As the ball head 14 is pressed firmly against the bearing shell when the housing 10 is closed, the bearing shell undergoes a high elastic compression in the contact region. Accordingly a very steep curve of force over displacement is the result. It can be seen here that the curve runs without discontinuity through the zero point, because the ball joint does not have any play.

In FIG. 4b the profile of force over displacement of the ball head is shown, which occurs in the case of a ball joint with intensive wear. The wear has led the wall thickness of the bearing shell 12 to be partially reduced in the contact region to the ball head through settlement and abrasion. The ball head 14 can therefore be moved about its central position substantially without force downwards and upwards, whilst after abutment against the bearing shell 12 it can only be displaced further when the material of the bearing shell is compressed elastically. Therefore, a discontinuity of the curve is produced in the region of the zero passage, i.e. on a reversal of the load direction, whilst the curve outside the discontinuity has approximately the same gradient as in a practically new ball joint.

It is clearly undesirable if a worn ball joint has play. On the one hand, the play leads to noises when the ball head is moved from one side of the bearing shell to the other when the load direction is reversed. On the other hand, the play leads to increased stresses of the ball joint and of the components coupled therewith when the load direction is reversed.

From EP 0 784 755 A1, and corresponding U.S. Pat. No. 5,851,082, both of which are incorporated by reference herein in entirety, a ball joint is known which attempts to eliminate the occurrence of play due to wear. In this ball joint, a rubber ring is arranged between the housing and the bearing shell, the ring being compressed when the ball joint is installed and thereby partially pressing the bearing shell elastically against the ball head. Even if the bearing shell becomes worn, it continues to lie against the ball head because of the elastic force exerted by the rubber ring. In this way it is prevented that a play occurs and the ball head can be moved free of force inside the housing. However, a disadvantage in the known ball joint is that an additional component is present in the form of the rubber ring, which must be produced, kept in readiness and installed. This leads to increased costs.

BRIEF SUMMARY OF THE INVENTION

A feature of the invention consists in further developing a ball joint of the type initially mentioned to the effect that it can be produced at a favourable cost and nevertheless a play is prevented from occurring inside the housing.

To achieve this feature, in a ball joint of the type initially mentioned provision is made according to the invention that the bearing shell is bent open elastically by the ball head so that the restoring force resulting from its deformation applies a prestress onto the ball head which attempts to press the latter out of the housing. The invention is based on the fundamental idea of using the inherent elasticity of the bearing shell to produce the prestress. For this purpose, the bearing shell is produced with a shape which does not entirely fit the shape of the ball head and the inner surfaces of the housing, so that the bearing shell is deformed elastically, in particular is expanded, on installation. The restoring forces resulting therefrom ensure that the bearing shell also lies against the ball head without play when the wall thickness of the bearing shell is reduced by wear.

Advantageous developments of the invention will be apparent from the dependent claims.

Other advantages of this invention will become apparent to those skilled in the art from the following detailed description of the preferred embodiments, when read in light of the accompanying drawings.

DETAILED DESCRIPTION OF THE INVENTION

Figure 1:
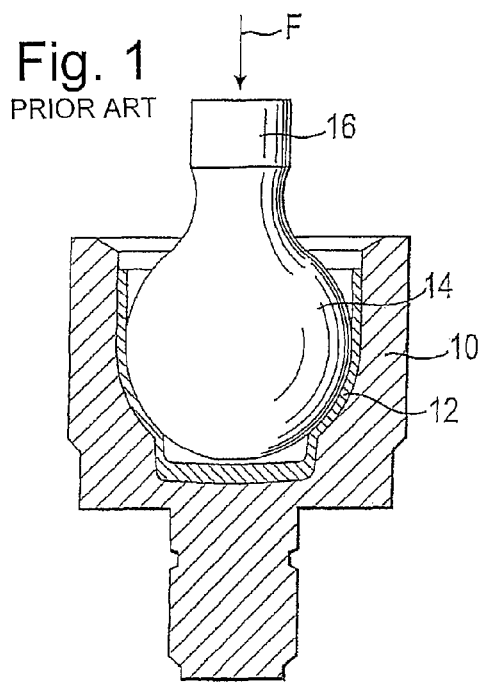
FIG. 1 shows a section through a ball joint according to the prior art in the partially installed state.
Figure 3:
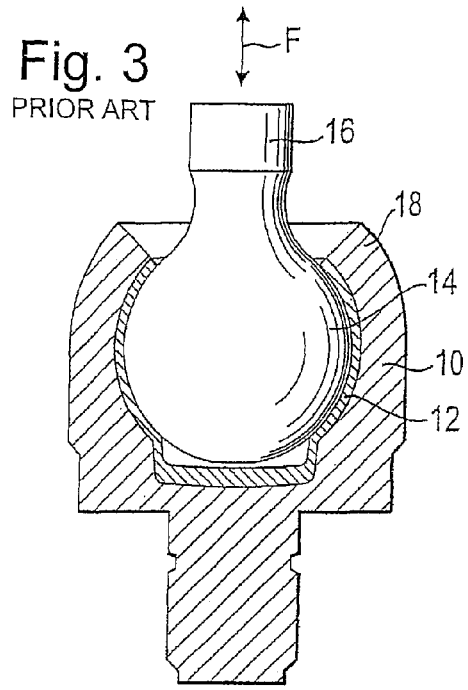
FIG. 3 shows in a section a ball joint according to the prior art in the fully installed state.
Figure 5:
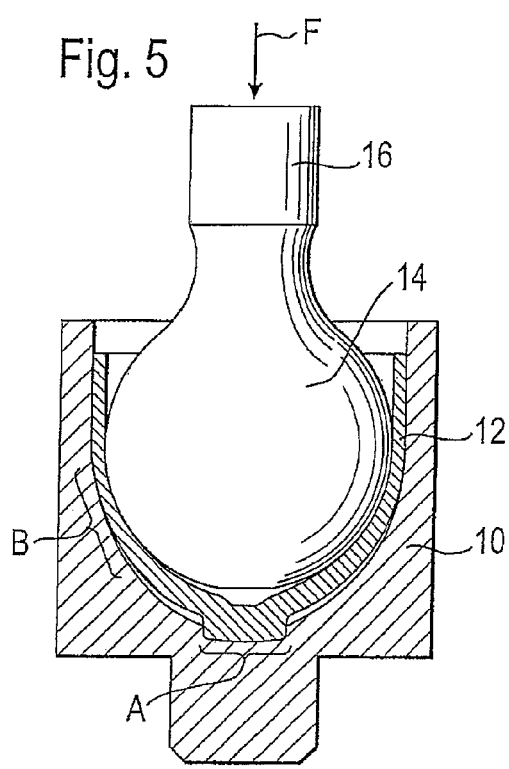
FIG. 5 shows a section through a ball joint according to the invention in the partially installed state.

In FIG. 5 a ball joint can be seen, which in the same manner as the ball joint known from FIG. 1 has a housing 10 in which a bearing shell 12 is arranged, which in turn holds a ball head 14 of a ball pin 16. In contrast to the ball joint of FIG. 1, the bearing shell 12 here is constructed with an internal space the dimensions of which, expressed in general terms, are smaller than the dimensions of the ball head 14. In particular, in an encircling region B which lies slightly below the equator of the ball head 14, the bearing shell has a radius of curvature which is smaller than the radius of the ball head. This leads to the ball head 14 not being able to be fully inserted into the bearing shell 12 and the housing 10. It can be seen that an encircling free space remains both between the ball head and the bearing shell and also between the bearing shell and the housing.

Figure 2:
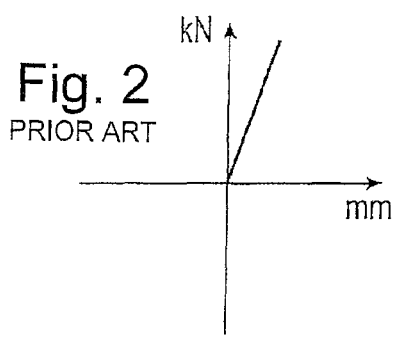
FIG. 2 shows a characteristic of load over displacement of the ball head for the ball joint of FIG. 1.
Figure 4A:
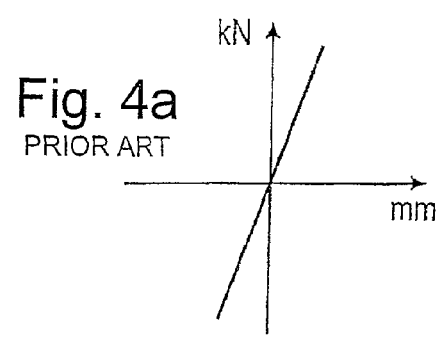
FIG. 4a and FIG. 4b respectively show a characteristic of load over displacement of the ball head for the ball joint of FIG. 3 in the practically new state and in the worn state, respectively.
Figure 4B:
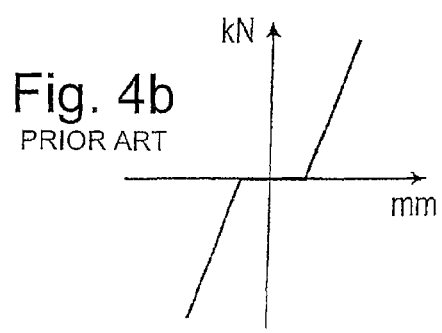
Figure 6:
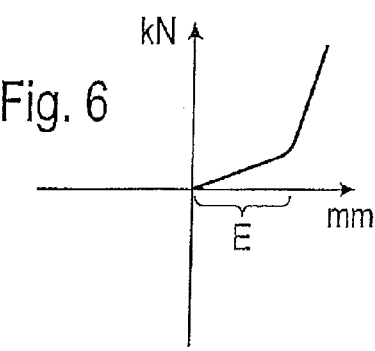
FIG. 6 shows a characteristic of load over displacement of the ball head for the ball joint of FIG. 5.

If the ball head 14 is stressed in this state in the direction of the arrow F, the characteristic of load over displacement of the ball head is produced which is illustrated in FIG. 6. There is firstly a comparatively large region E in which the bearing shell 12 yields elastically and is in particular expanded. This process is comparable to the expansion of a disk spring and differs substantially from the characteristic of FIG. 2. In the ball joint according to the invention, the bearing shell 12 is prestressed in the manner of a spring when the ball head is pressed to the bottom of the bearing shell. This process is concluded when both the free space between the ball head 14 and the bearing shell 12 and also between the bearing shell 12 and the housing 10 is completely eliminated in the support region B. From this point, the characteristic of force over displacement of the ball head rises sharply, because from this point the material of the bearing shell 12 must be compressed.

Figure 7:
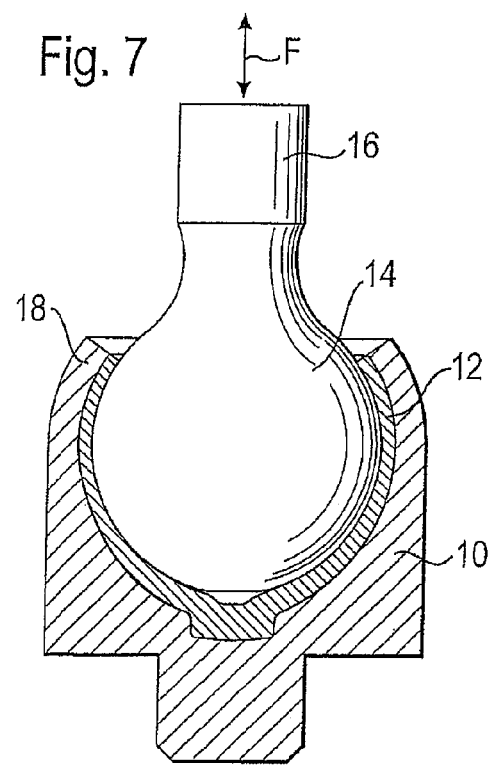
FIG. 7 shows in a section a ball joint according to the invention in the fully installed state.

In FIG. 7 the ball joint is shown in the fully installed state. The flanged marginal region 18 of the housing 10 holds the ball head in a state in which it is pressed firmly downwards into the housing 10 and in which the bearing shell 12 is elastically prestressed and no free space at all is present in the support region B on the one hand between the ball head 14 and the bearing shell 12 and on the other hand between the bearing shell 12 and the housing 10.

Figure 8A:
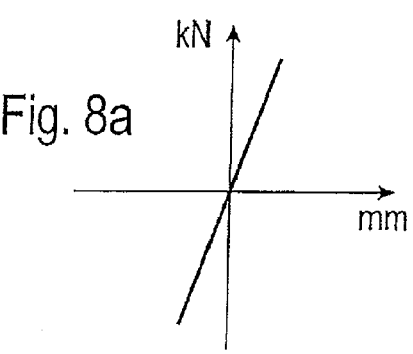
FIG. 8a and FIG. 8b respectively show a characteristic of load over displacement of the ball head for the ball joint of FIG. 7 in the practically new state and in the worn state, respectively.
Figure 8B:
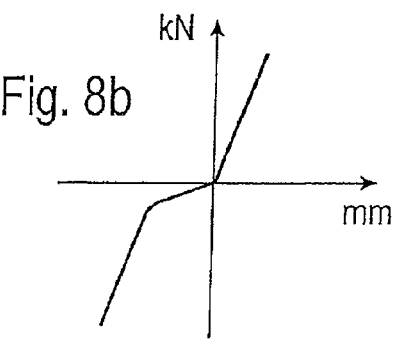

The resulting characteristics of the ball joint of FIG. 7 are shown in FIGS. 8a and 8b. In the non-worn state (FIG. 8a) a straight characteristic is produced with a zero passage, because in each direction of load the material of the bearing shell 12 must be compressed directly (see the continuous line). In the worn state (FIG. 8b) it can be seen that no play of the ball joint is produced in the region of the zero passage, i.e. with a reversal of the direction of load, but rather in each case the ball head must be moved against a defined force. This is due to the fact that the elastic restoring force of the bearing shell 12 makes provision that the ball head is pressed towards the flanged rim 18 of the housing, so that no play can occur.

In accordance with the provisions of the patent statutes, the principle and mode of operation of this invention have been explained and illustrated in its preferred embodiment. However, it must be understood that this invention may be practiced otherwise than as specifically explained and illustrated without departing from its spirit or scope.

The invention claimed is:

1. A ball joint assembly kit adapted for use in an axial joint, the kit having a housing, a bearing shell which is arranged in the housing, and a ball pin with a ball head which is arranged in the bearing shell, characterized in that in a non-installed initial state the bearing shell in a region which lies above a closed bottom end of the bearing shell and lies below an equator of the ball head has a radius of curvature which is smaller than a radius of the ball head to create a free space between the bearing shell and the ball head in the region which prevents the ball head from being able to be fully inserted into the bearing shell, and wherein following assembly by pressing the ball head toward the bottom closed end of the bearing shell and closing the housing by flanging inwards a marginal region of the housing which presses the bearing shell and the ball head together causing the bearing shell to be expanded and deformed elastically, wherein the free space in the region is eliminated.

2. The ball joint assembly kit according to claim 1, wherein in the non-installed state there is a free shape in the region between the bearing shell and the housing and wherein following the assembly substantially no free space is present in the region between the housing and the bearing shell.

3. The ball joint assembly kit according to claim 1, wherein in the region, the bearing shell has different radii of curvature inside and outside in the non-installed initial state.

4. The ball joint assembly kit according to claim 1, wherein the bearing shell is supported in the housing by an area defined adjacent the closed bottom end thereof.

5. The ball joint assembly kit according to claim 1, wherein the radius of curvature of the housing runs eccentrically in the region.

6. The ball joint assembly kit according to claim 1, wherein in the region, an inner surface of the housing is formed by several radii of curvature also running eccentrically.

* * * * *